A. NOBEL.
Improvement in Exploding Nitro-Glycerine.
No. 4,816. Reissued March 19, 1872.
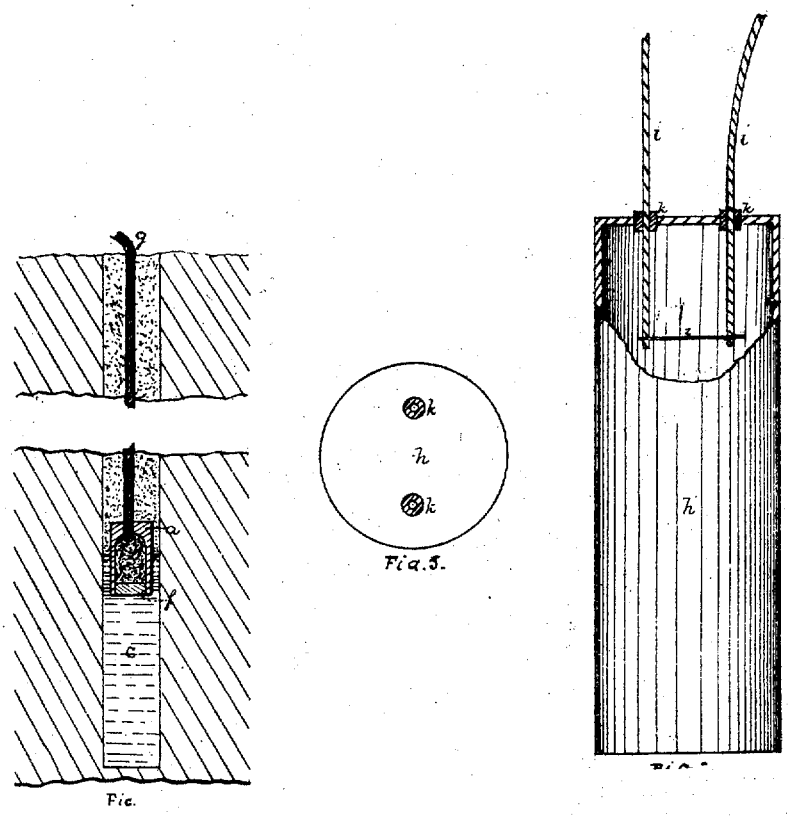
Fig. Fig. 5. Fig.
Witnesses:
Octavius Knight
Edw. F. Brown
Assignee The United States Blasting Oil Company
Jas. S. Thorpe President.

UNITED STATES PATENT OFFICE.

ALFRED NOBEL, OF HAMBURG, GERMANY, ASSIGNOR TO THE UNITED STATES BLASTING-OIL COMPANY, OF NEW YORK, N. Y.

IMPROVEMENT IN EXPLODING NITRO-GLYCERINE.

Specification forming part of Letters Patent No. 50,617, dated October 24, 1865; reissue No. 3,378, dated April 13, 1869; reissue No. 4,816, dated March 19, 1872.

DIVISION B.

SPECIFICATION.

*To all whom it may concern:*

Be it known that ALFRED NOBEL, of the city of Hamburg, Germany, has invented certain new and useful Improvements in the Manufacture of Nitro-Glycerine and certain compounds thereof, and in the utilization as explosives of the same and analogous substances, known as nitrates of ethyl and of methyl and nitro-manite.

The improvement in the manufacture of nitro-glycerine is the subject of a separate specification; this specification having reference to certain modes of utilizing, as explosives, nitro-glycerine and the analogous substances above mentioned.

There is a class of explosives long known, but not at the date of NOBEL'S invention applied to technical purposes, in consequence of practical difficulties in procuring their explosion. Such substances are nitro-glycerine, the nitrates of ethyl and of methyl and nitro-manite. These substances are liquids at ordinary temperatures, and by that characteristic are distinguishable from solid explosives, such as gunpowder, gun-cotton, &c.; and they have also the property that fire may be applied to them without exploding. Nitro-glycerine, for example, if ignited in an open space, is slowly decomposed and takes fire, but the flame is apt to die out when the match is withdrawn; hence it cannot, under ordinary circumstances, be looked upon as a ready explosive agent; for while gunpowder, and other substances used as explosives prior to NOBEL'S invention, always explode or deflagrate throughout the whole mass when fire is set to them, nitro-glycerine and the analogous substances before named will not explode from the mere contact of flame. So, also, if a drop of nitro-glycerine be poured on an anvil, the blow of a hammer causes it to explode, but only that part is involved which has received the blow, so that in this case the explosion is merely a local one.

A principal object of NOBEL'S invention consists in the removal of this obstacle to the use of nitro-glycerine and the analogous substances before named as explosives. For this end, two different methods were invented by NOBEL for promoting the expulsion of nitro-glycerine; one method, which forms the subject of a separate specification, relates to the combination with nitro-glycerine of other more easily explosive substances; and the other method, which is the subject of this patent, relates to the means of effecting the explosion without such combination. This is accomplished either by procuring an initial explosion of a minute portion of the whole charge of nitro-glycerine, which then, by means of the heat and pressure of the gas thus developed, involves the whole mass in explosive decomposition, or by creating an impulse of explosion by means of concussive agitation; the means employed in both cases being in such relation to the mass of nitro-glycerine to be exploded as that the latter shall be confined within the influence of such initial explosion or impulse of explosion. The pressure being developed by the heating to the point of explosion of a minute portion of the charge, nitro-glycerine is made use of in the one instance; and in the other the detonation of some violently exploding substance in presence of the charge of nitro-glycerine.

Nitro-glycerine as well as the analogous explosives hereinbefore named being liquid, if in such condition that it cannot escape from the influence of the initial explosion, (as, for instance, when placed in a bore-hole for blasting,) receives and propagates the initial pressure through its whole mass, and the first impulse of explosion is communicated throughout the whole charge, effecting its instantaneous decomposition and explosion. By the term impulse of explosion is meant motion produced to effect the explosion by suddenly communicated force.

There are many means of obtaining this impulse of explosion—such as, first, by placing the nitro-glycerine to be exploded in a tube or case of any suitable material which will hold it, and surrounding this tube with gunpowder, gun-cotton, or any readily exploding substance, which, being easily fired by any of the well-known means, will instantaneously cause the explosion of the nitro-glycerine in the tube; or, by reversing this process and pouring the nitro-glycerine into the bore-hole (for blasting)

and inserting into the nitro-glycerine a tube charged with gunpowder or gun-cotton, or other easily-exploding substance, when, by firing the charge in the tube, the nitro-glycerine is also exploded.

When used for the purposes of blasting, the nitro-glycerine may be poured directly into the bore-hole, which may be closed above to prevent the scattering or blowing out of the charge; for which purpose loose sand will do, or the upper part of the bore may be left entirely open. If not convenient to pour the nitro-glycerine directly into the bore-hole, it may be placed in cases of paper or metal, or other suitable material, open or closed at top, as may be preferred.

Second. By the use of what NOBEL calls "igniters" or "burners," being a small tube of glass, paper, or other material, filled or charged with gunpowder or other easy explosive, and furnished with a fuse or other means of igniting the same by fire or by an electric spark. The burner may be introduced into the nitro-glycerine and being fired in any convenient manner, its explosion gives to the nitro-glycerine the requisite impulse of explosion. These igniters may be greatly varied in construction, but in their simplest form they consist of a wooden cylinder hollow inside and filled with gunpowder, being corked at the one end and connected with a fuse at the other. When the nitro-glycerine has been poured into the bore or blast-hole, this cylinder is let down by its fuse until it swims in the nitro-glycerine, and then, if desired, the upper part of the bore is filled with loose sand, and nothing remains but to ignite the fuse. The fuse in its turn fires the explosive contained in the wooden cylinder, the hot gases of which rush into the charge of nitro-glycerine and the whole mass immediately explodes.

In the drawing, Figure 1 illustrates one of these igniters, in which *a* is the wooden cylinder; *c*, the cavity, filled with gunpowder and closed by the cork or plug *f*; and *g*, the fuse. The nitro-glycerine in the bore-hole is represented at *e*.

Third. A third method is to heat a minute portion of the charge of nitro-glycerine to its point of explosion by inclosing a minute portion of nitro-glycerine in a tube filled either with rocket-powder, (which, being easily ignited, is fired in any convenient way,) or with lime and water, or some other chemical agents adapted to combine gradually, and by their reaction create the necessary heat. The explosion in the tube will give to it the impulse required to explode the mass of nitro-glycerine.

Fourth. A fourth mode of producing the initial explosion is by means of a spark, or by heat developed by a powerful current of electricity within the charge of nitro-glycerine, which is so inclosed as not to afford an escape to the gas developed thereby. Figs. 2 and 3 illustrate the apparatus for thus effecting the explosion. *h* is the case for holding the charge of nitro-glycerine, which may be closed at top or not, as may be preferred. *i i* are two wires, which pass through glass tubes *k k*, or other insulating substances in the plug or cap of the case, the wires being immersed in the nitro-glycerine, and their lower ends connected by a fine platina wire, *z*. The wire *z* being heated by the passage of the electric current, the liquid in contact with the wire is decomposed, giving the initial explosion, and the heat and pressure developed thereby instantaneously decompose and explode the contents of the case.

Fifth, still another method is by means of a capsule, more commonly termed in military art a percussion-cap, which, being exploded in any convenient manner, gives, by its detonation, the requisite impulse to explode the charge of nitro-glycerine.

Sixth, the necessary initial explosion may also be effected by means of an ordinary blasting-fuse. This will do in a closed space and under sufficient resistance; but, if the gases of the portion of the nitro-glycerine decomposed by the heat of the fuse are enabled to escape before they accumulate to such a pressure as to effect the requisite impulse of explosion, the nitro-glycerine is slowly decomposed and the fire generally goes out before the whole is consumed. The explosion if produced by a fuse under the condition of the confinement of the nitro-glycerine is effected by the initial decomposition of a minute portion of nitro-glycerine.

In speaking of nitro-glycerine in the foregoing specification and in the following claims, the nitrates of ethyl and methyl and nitro-manite (being fluid explosives analogous in character and composition to nitro-glycerine) are intended to be included as if specially mentioned.

In view of the fact that the explosive substances hereinbefore named, which are liquid at the ordinary temperature, had not at the date of NOBEL's invention been applied to any technical use as explosives, and that by his invention he introduced these substances from the domain of science into that of practical use in the arts—

What we claim as the invention of said ALFRED NOBEL, and desire to secure by Letters Patent in the name of The United States Blasting-Oil Company, as assignee of said NOBEL, is—

1. A charge of gunpowder, gun-cotton, or other easily-igniting and exploding substance, surrounding a tube or case containing the charge of nitro-glycerine, as a means of exploding the same, substantially as hereinbefore described.

2. A charge of gunpowder, gun-cotton, or other easily-igniting and exploding substance, surrounded by a nitro-glycerine charge, and combined therewith as a means of exploding the same, substantially as and for the purpose hereinbefore described.

3. A nitro-glycerine igniter or exploder, consisting of a tube or case inclosing a minute portion of nitro-glycerine, together with lime and water, or other equivalent substances, which by combining will evolve the requisite heat to explode the nitro-glycerine therein, substantially as and for the purposes hereinbefore described.

4. An igniter or exploder, consisting of a tube or case containing rocket-powder mixed with a minute portion of nitro-glycerine, and furnished with a fuse or other means of setting fire to the igniting charge, substantially as hereinbefore described.

5. An electric spark, or heat generated by electricity within the charge of nitro-glycerine, as a means of promoting an impulse of explosion therein, substantially as hereinbefore described.

6. A capsule or percussion-cap, furnished with a suitable means of firing or exploding the same, and suitably arranged in relation to the nitro-glycerine so as by its detonation to impart the necessary impulse of explosion thereto, substantially as hereinbefore described.

7. An igniter for producing the explosion of nitro-glycerine, consisting of a case of wood or other suitable material for holding the initial explosion-charge, closed with a cork or plug, and a fuse or other means of ignition, substantially as hereinbefore described.

In witness whereof the said THE UNITED STATES BLASTING-OIL COMPANY, by TAL. P. SHAFFNER, President, have hereunto set their hand.

THE UNITED STATES BLASTING-OIL CO.,
By TAL. P. SHAFFNER, *President.*

Witnesses:
OCTAVIUS KNIGHT,
EDMD. F. BROWN.